No. 774,950. PATENTED NOV. 15, 1904.
C. K. PICKLES.
BRAKE MECHANISM.
APPLICATION FILED NOV. 24, 1903.
NO MODEL.
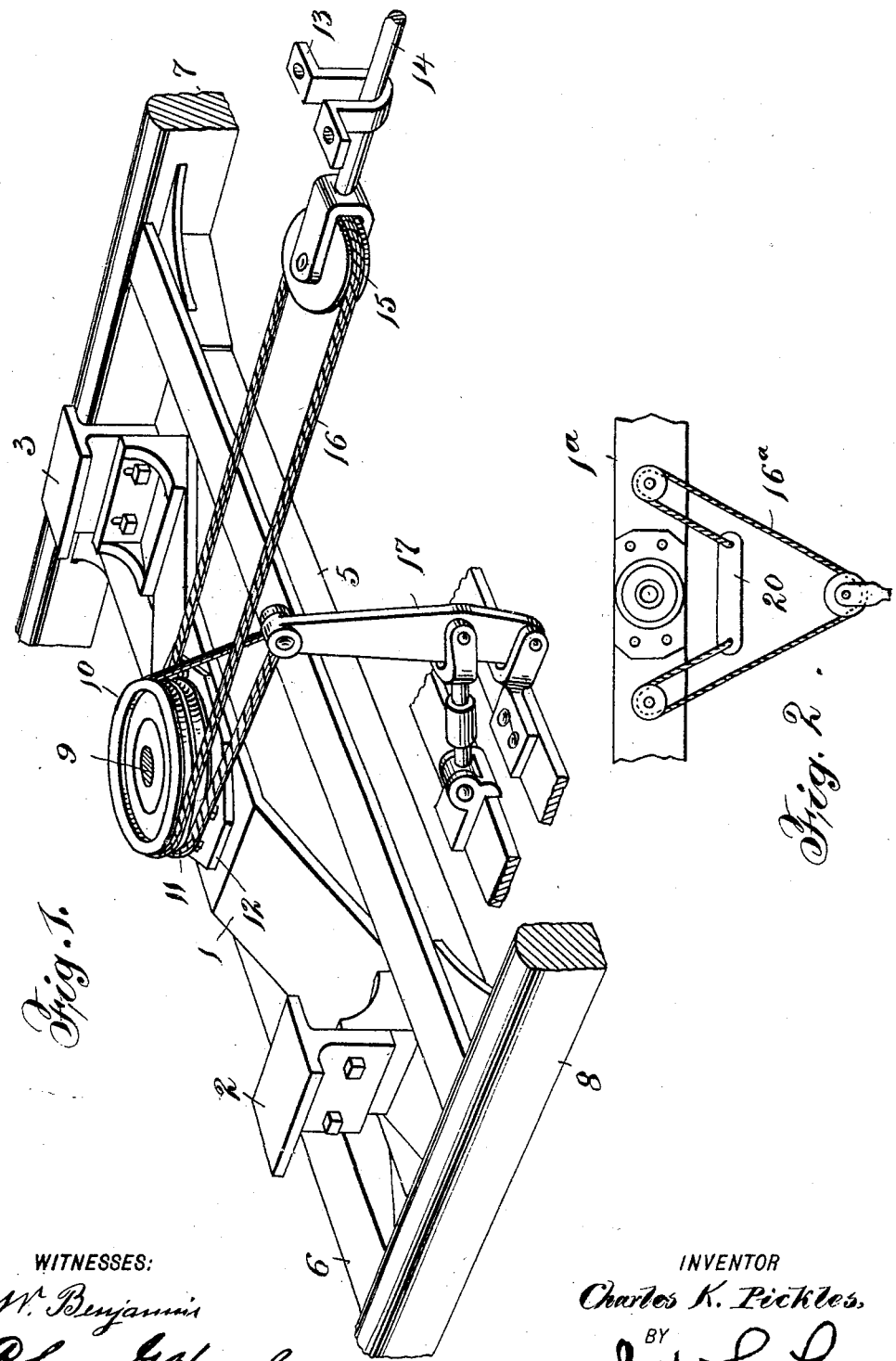
WITNESSES:
C. W. Benjamin
Chas. G. Hensley
INVENTOR
Charles K. Pickles,
BY
Joseph L. Levy
HIS ATTORNEY No. 774,950.

Patented November 15, 1904.

UNITED STATES PATENT OFFICE.

CHARLES K. PICKLES, OF PHILADELPHIA, PENNSYLVANIA, ASSIGNOR TO JOHN A. BRILL, OF PHILADELPHIA, PENNSYLVANIA.

BRAKE MECHANISM.

SPECIFICATION forming part of Letters Patent No. 774,950, dated November 15, 1904.

Application filed November 24, 1903. Serial No. 182,442. (No model.)

*To all whom it may concern:*

Be it known that I, CHARLES K. PICKLES, a citizen of the United States, and a resident of the city and county of Philadelphia, State of Pennsylvania, have invented certain new and useful Improvements in Brake Mechanism, of which the following is a specification.

My invention relates to the means which connect the part of a brake which is on a pivotal truck with the part fixed to the car-body, so that the brakes may be applied evenly and with the same tension without regard to the turning of the truck when passing round a curve, and has for its object to provide a simpler and better mechanism of this class.

For a more particular description of some embodiments of my invention reference is to be had to the accompanying drawings, forming a part hereof, in which—

Figure 1 is a perspective view of a portion of a truck-frame with my improvements. Fig. 2 is a plan view of a modified structure.

Throughout both views similar reference characters designate similar parts.

The bolster 1 is provided with the usual side bearings 2 and 3 and is supported between transoms 5 and 6, which connect the top cords 7 and 8, all of which may be of the well-known and conventional forms.

Concentric with the king-bolt 9 and pivoted thereon are loose grooved pulleys 10 and 11, one on top of the other, and the lower one, 11, rests on a rub-plate 12. A second rub-plate (not shown) rests over the pulley 10 and supports the car-body without interfering with the movements of the pulleys 10 and 11.

A hanger 13 is suspended from the car-frame and through it passes a rod 14, which may be connected with an air-cylinder or any other suitable source of power, and the other end of this rod is provided with a grooved pulley 15. One end of the cord or preferably a cable 16 is secured to the upper end of a truck brake-lever 17 and passes over the pulley 11, thence over the pulley 15, and then over the pulley 10 and finally returns to the upper end of the lever 17, where it is secured in any suitable way. Only portions of the brake-beams are shown, as these and the remaining parts may be of any suitable form.

From the above the operation of my improvement is obvious. Where pressure is applied through the rod 14, the cord 16 is pulled on each side of the pulley 15, thereby turning the pulley 10 in one direction and the pulley 11 in the other and drawing the lever 17 toward the bolster. As the pulleys 10 and 11 are of the same diameter, this action is not in any way interfered with by a curve which turns the truck as the cable 16 unwinds from one of these pulleys precisely what winds on the other, and the pulley 15 permits shifting of the cable without hindrance.

In the modification shown in Fig. 2 the pulleys on the bolster 1$^a$ are placed on each side of the center and the ends of the cable 16$^a$ are secured to a bar 20, which is connected to the brake mechanism of the truck. As the action of the mechanisms is similar in both modifications, further description is believed to be unnecessary.

While I have shown and described certain embodiments of my invention, it is obvious that many others may be had which employ its essential features and come within the scope thereof.

What I claim is—

1. In a brake mechanism, means adapted to be secured to a car-frame, means adapted for applying power to a brake, means adapted to be secured to a pivotal truck for applying said brake, and an equalizing cord or cable connecting said car-supported means so that the tension of the brake will always be the same regardless of the radiation of the truck with said truck-supported means.

2. In a brake mechanism, means adapted to be secured to a car-frame for applying power to a truck, means adapted to be secured to a pivotal truck for applying said brake, a cord or cable and pulleys connecting said car-supported means so that the tension of the brake will always be the same regardless of the radiation of the truck with said truck-supporting means.

3. In a brake mechanism, a rod, a truck brake-lever, a brake-beam connected with the said lever, a cable connecting said rod and lever.

4. In a brake mechanism, a rod with a pulley, pulleys adjacent to the king-bolt, a truck brake-lever and a cord or cable passing over said pulleys and fixed to said lever so that the tension on the brake is not affected by the radiation of the truck.

5. In a brake mechanism, a rod with a pulley, a truck with a king-bolt, pulleys turning on said king-bolt, a truck brake-lever, and a cable passing over said pulleys and connecting said rod and truck brake-lever so that the former actuates the latter.

6. In a brake mechanism, a rod with a pulley, a truck with a king-bolt and a truck brake-lever, pulleys on said king-bolt, one above the other, and a cable connecting said rod and lever and passing over said pulleys.

7. In a brake mechanism, a rod with a pulley, a truck with a brake-lever and king-bolt, two pulleys, one resting on the other, and both concentric with said king-bolt, and a cord passing over all of the said pulleys and connecting said lever and rod.

8. In a brake mechanism, a pulley and means for supporting the same, a truck brake-lever, and means connecting said lever and pulley so that the latter will always act on the former with the same tension regardless of the relative positions of the truck and car-body.

9. In a brake mechanism, a pulley and means for supporting the same, a truck with a brake-lever and flexible means connecting said pulley and lever so that the pulley can always be made to actuate the lever with the same tension regardless of the relative positions of the car and truck.

Signed in the city and county of Philadelphia, State of Pennsylvania, this 19th day of November, 1903.

CHARLES K. PICKLES.

Witnesses:
B. D. ACKLEY,
TERRENCE McCUSKER.